(12) United States Patent
Kachare et al.

(10) Patent No.: US 10,430,357 B2
(45) Date of Patent: *Oct. 1, 2019

(54) SELECTIVELY ENABLE DATA TRANSFER BASED ON ACCRUED DATA CREDITS

(71) Applicant: Seagate Technology LLC, Cupertino, CA (US)

(72) Inventors: Ramdas Kachare, Cupertino, CA (US); Timothy Canepa, Los Gatos, CA (US)

(73) Assignee: Seagate Technology, LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,910

(22) Filed: Feb. 20, 2018

(65) Prior Publication Data

US 2018/0173658 A1 Jun. 21, 2018

Related U.S. Application Data

(63) Continuation of application No. 14/858,716, filed on Sep. 18, 2015, now Pat. No. 9,934,174.

(51) Int. Cl.
*G06F 13/36* (2006.01)
*G06F 13/28* (2006.01)
*G06F 13/42* (2006.01)
*G06F 13/40* (2006.01)
*G06F 13/16* (2006.01)

(52) U.S. Cl.
CPC .......... *G06F 13/28* (2013.01); *G06F 13/1605* (2013.01); *G06F 13/4022* (2013.01); *G06F 13/4282* (2013.01)

(58) Field of Classification Search
CPC .. G06F 13/28; G06F 13/1605; G06F 13/4022; G06F 13/4282
See application file for complete search history.

(56) References Cited

U.S. PATENT DOCUMENTS

| | | | | |
|---|---|---|---|---|
| 5,274,644 | A * | 12/1993 | Berger | H04L 12/5602 370/230 |
| 7,474,670 | B2 * | 1/2009 | Nowshadi | G06F 9/5011 370/232 |
| 8,325,723 | B1 * | 12/2012 | Wang | H04L 47/36 370/235 |
| 2006/0179182 | A1 * | 8/2006 | Chadha | G06F 13/4059 710/29 |
| 2007/0038791 | A1 * | 2/2007 | Subramanian | G06F 13/362 710/116 |

(Continued)

*Primary Examiner* — Jing-Yih Shyu
(74) *Attorney, Agent, or Firm* — Taylor English Duma LLP

(57) ABSTRACT

An apparatus to arbitrate data transfer between a computing host and a storage device across an interface includes a data transfer limiter configured to track an amount of data credits used by a data transfer across the interface and an amount of accrued data credits available to the interface. The apparatus further includes a data transfer arbiter configured to selectively disable the data transfer across the interface when the amount of data credits used by the data transfer across the interface exceeds a first threshold, and to selectively enable the data transfer across the interface when the amount of data credits used by the data transfer across the interface does not exceed a second threshold. The amount of accrued data credits reduces the amount of data credits used by the data transfer.

14 Claims, 3 Drawing Sheets

(56) References Cited

U.S. PATENT DOCUMENTS

| | | | |
|---|---|---|---|
| 2012/0239833 A1* | 9/2012 | Yoshimura | G06F 3/06 |
| | | | 710/52 |
| 2013/0086586 A1* | 4/2013 | Lakshmanamurthy | ...................... |
| | | | G06F 15/7864 |
| | | | 718/100 |
| 2014/0229645 A1* | 8/2014 | Gabbay | G06F 13/364 |
| | | | 710/113 |
| 2014/0379910 A1* | 12/2014 | Saxena | H04L 47/70 |
| | | | 709/225 |
| 2016/0342391 A1* | 11/2016 | Hathorn | G06F 13/126 |

* cited by examiner

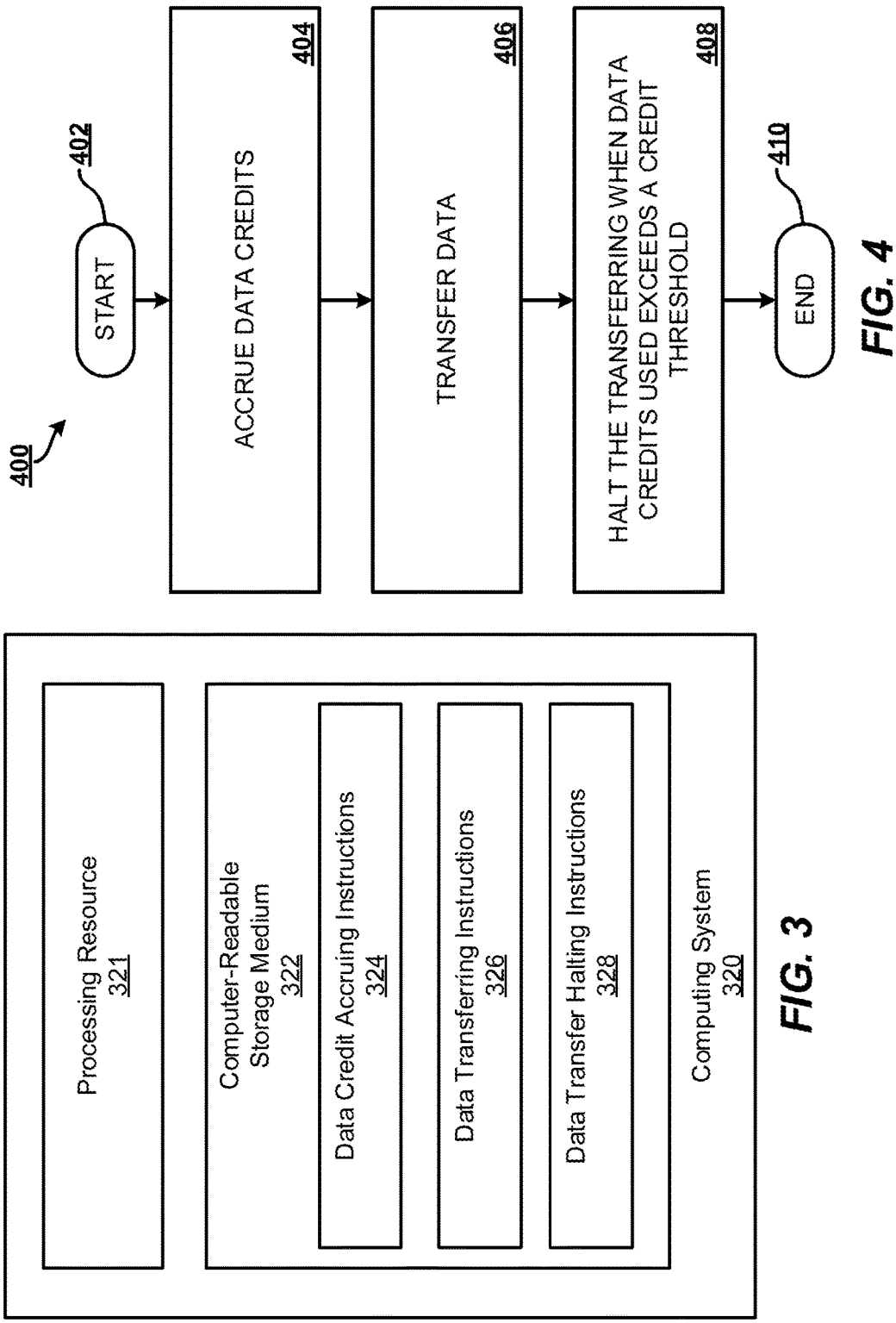

SELECTIVELY ENABLE DATA TRANSFER BASED ON ACCRUED DATA CREDITS

CROSS-REFERENCE TO RELATED APPLICATION

This application is a continuation of U.S. patent application Ser. No. 14/858,716, filed on Sep. 18, 2015, the entire disclosure of which is hereby specifically and entirely incorporated by reference.

SUMMARY

A computing system such as a desktop, laptop, server, and other similar computing systems utilize storage devices for accessing and storing data. The storage devices may comprise a memory for storing data and a storage controller for processing and managing data transfer between the computing system and the storage drive. In examples, the computing system may transfer data to and from (e.g., write data to and read data from) a memory device of a storage device via an interface connecting the computing system and the storage device. As a result of repeated data transfers, the memory of the storage device may wear out over time.

BRIEF DESCRIPTION OF THE DRAWINGS

The following detailed description references the accompanying drawings that illustrate various aspects of the present disclosure. The drawings are not to scale, and like numerals represent like elements throughout the figures.

FIG. 3 illustrates a non-transitory computer-readable storage medium storing instructions to selectively enable data transfer using accrued data credits according to aspects of the present disclosure.

FIG. 4 illustrates a flow diagram of a method to selectively enable data transfer using accrued data credits according to aspects of the present disclosure.

DETAILED DESCRIPTION

Figure 1:
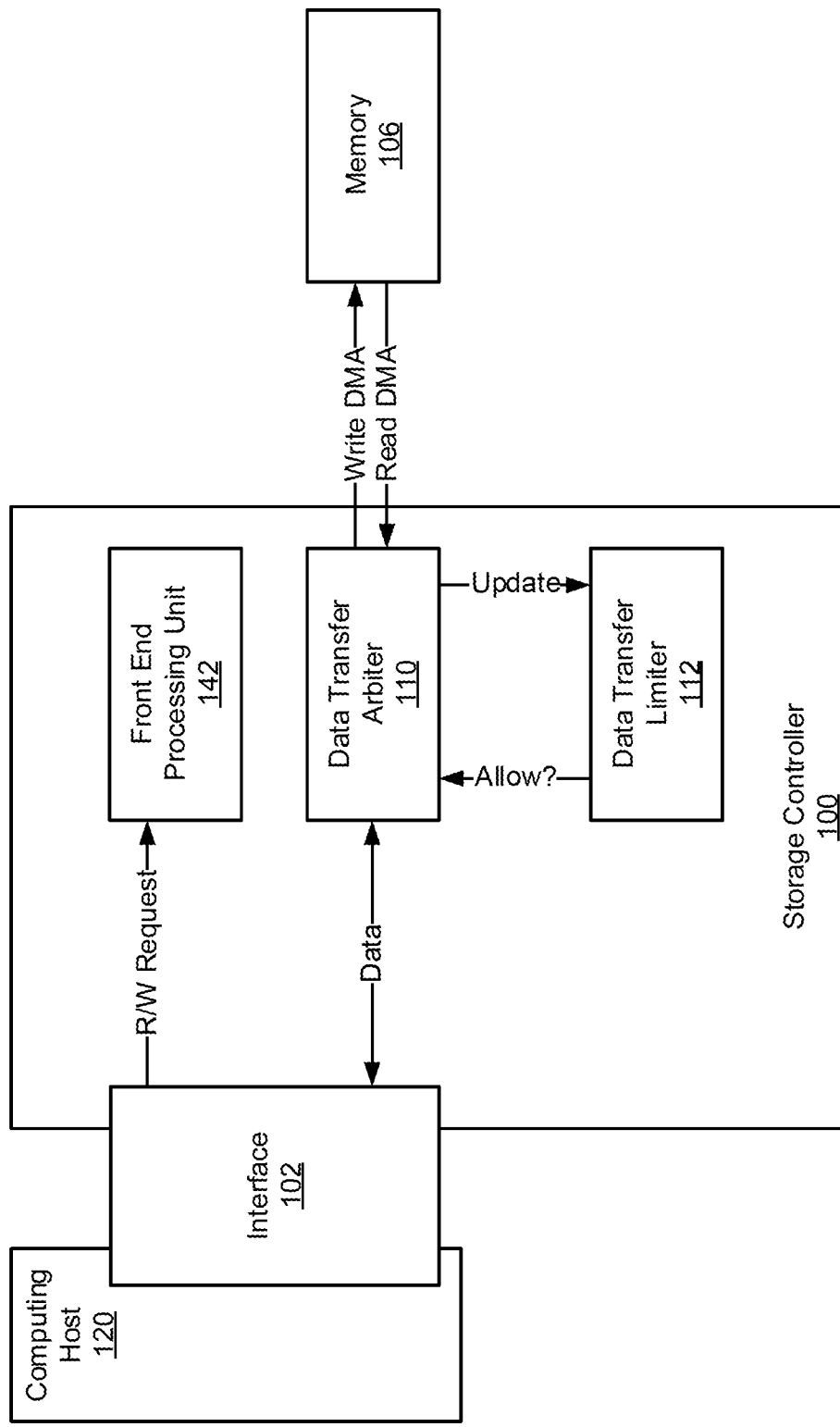
FIG. 1 illustrates a block diagram of a storage controller for selective enablement of data transfer using accrued data credits according to aspects of the present disclosure.

Memory devices in storage devices, such as flash media in solid state disks (SSD), have limited endurance and can be accessed for a limited number of times before wearing out and failing. Because storage devices may have fast host interfaces, such as a peripheral component interconnect express (PCIe) interface, a serial ATA interface, a small computer system interface (SCSI), and a serial attached SCSI (SAS) interface, applications on a connected host computing system can write large amounts of data in a very short time period. This may wear out the memory devices at a faster than desired rate. For example, a storage device (e.g., a solid state disk) may wear out before desired, such as before the expiration of a warranty period (e.g., 3 years, 5 years, etc.) associated with the storage device. Consequently the storage device manufacture may have to replace many storage devices during the warranty period because the storage devices wear out prematurely due to the fast data transfer rate. The storage device replacements may impose potentially substantial costs to the storage device manufacturer.

Some solutions rely on software-based rate limiting to reduce the number of data reads and writes to and from a storage device, which may be unpredictable and/or unreliable.

Various implementations are described below by referring to several example techniques to selectively enable data transfer using accrued data credits. In one example implementation, an apparatus to arbitrate data transfer between a computing host and a storage device across an interface is disclosed according to aspects of the present disclosure. The apparatus comprises a read data transfer limiter configured to track an amount of read data credits used by a read data transfer across the interface, and track an amount of accrued read data credits available to the interface; a write data transfer limiter configured to track an amount of write data credits used by a write data transfer across the interface, and track an amount of accrued write data credits available to the interface; a read data transfer arbiter configured to selectively enable and selectively disable the read data transfer across the interface; and a write data transfer arbiter configured to selectively enable and selectively disable write transfer data across the interface.

In another example implementation, a method to arbitrate data transfer between a computing host and a storage device across an interface is disclosed according to aspects of the present disclosure. The method comprises the steps of tracking an amount of used read data credits comprising read data credits used by a read data transfer across the interface, tracking an amount of accrued read data credits available to the interface, tracking an amount of used write data credits comprising write data credits used by a write data transfer across the interface, tracking an amount of accrued write data credits available to the interface, selectively enabling and selectively disabling, by a read data transfer arbiter, the read data transfer across the interface, and selectively enabling and selectively disabling, by a write data transfer arbiter, the write data transfer across the interface.

In another example implementation, a system to arbitrate data transfer between a computing host and a storage device across an interface is disclosed according to aspects of the present disclosure. The system comprises a memory to store data accessed by the computing host; and a storage controller comprising a read data transfer limiter configured to track an amount of used read data credits comprising read data credits used by a read data transfer across the interface, and track an amount of accrued read data credits available to the interface, a write data transfer limiter configured to track an amount of used write data credits comprising write data credits used by a write data transfer across the interface, and track an amount of accrued write data credits available to the interface, a read data transfer arbiter configured to selectively enable and selectively disable the read data transfer across the interface, and a write data transfer arbiter configured to selectively enable and selectively disable the write data transfer across the interface.

In some implementations, the presently disclosed techniques may be utilized when performing wear leveling of a storage device. The presently disclosed techniques may also enable a storage device manufacture to charge less for a particular storage device by selectively limiting bandwidth use to enable a more expensive storage device to be sold at a lower price because of the reduction in bandwidth use (i.e., a failure probability of the storage device is reduced because the bandwidth use is also reduced). Additionally, the storage device may be better balanced during garbage collection. These and other advantages will be apparent from the description that follows.

Figure 2:
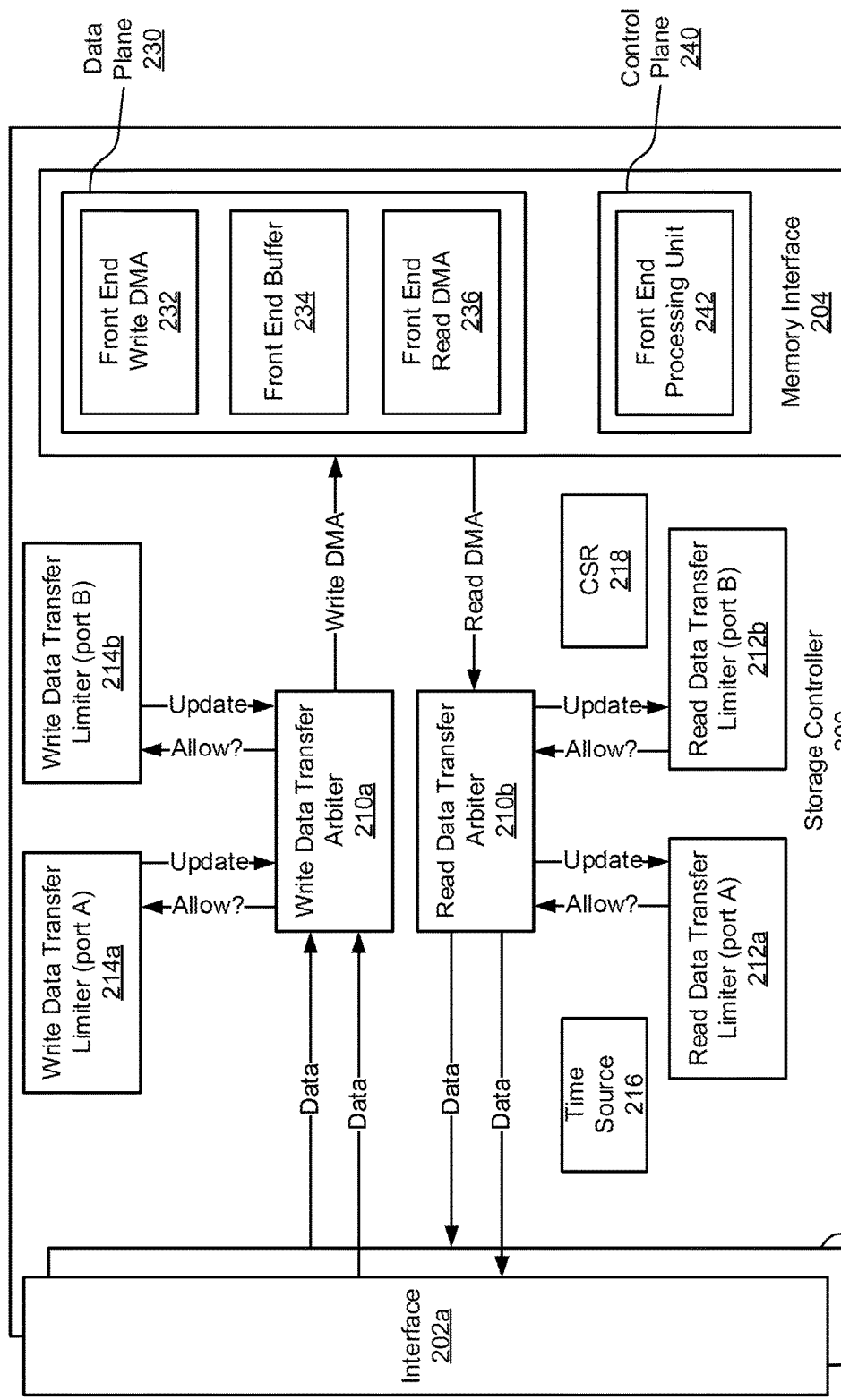
FIG. 2 illustrates a block diagram of a storage controller for selective enablement of data transfer using accrued data credits according to aspects of the present disclosure.

FIGS. 1-3 include particular components, modules, instructions, engines, etc. according to various examples as described herein. In different implementations, more, fewer, and/or other components, modules, instructions, engines, arrangements of components/modules/instructions/engines, etc. may be used according to the teachings described herein. In addition, various components, modules, engines, etc. described herein may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these.

Generally, FIGS. 1-3 relate to components and modules of a computing system, such as computing host 120 of FIG. 1 and computing system 320 of FIG. 3. It should be understood that the computing systems, such as computing host 120, may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, wearable computing devices, or the like.

FIG. 1 illustrates a block diagram of a storage controller 100 for selective enablement of data transfer using accrued data credits according to aspects of the present disclosure. In particular, FIG. 1 illustrates storage controller 100 communicatively coupled to a memory 106 and a computing host 120. Storage controller 100 arbitrates data transfer between a computing system such as computing host 120 and a storage device such as memory 106 across an interface such as interface 102 of computing host 120. The data arbitration prolongs the life of the storage device.

Computing host 120 may comprise a processing resource (not illustrated) that represents generally any suitable type or form of processing unit or units capable of processing data or interpreting and executing instructions. The processing resource may be one or more central processing units (CPUs), microprocessors, and/or other hardware devices suitable for retrieval and execution of instructions. The instructions may be stored, for example, on a memory resource (not shown), such as a computer-readable storage medium, which may comprise any electronic, magnetic, optical, or other physical storage device that store executable instructions. Thus, the memory resource may be, for example, random access memory (RAM), read-only memory (ROM), electrically-erasable programmable read-only memory (EPPROM), a storage drive, an optical disk, a solid state disk, a flash memory, and any other suitable type of volatile and/or non-volatile memory that stores instructions to cause a programmable processor (e.g., the processing resource) to perform the techniques described herein. In examples, the memory resource comprises a main memory, such as a RAM in which the instructions may be stored during runtime, and a secondary memory, such as a non-volatile memory in which a copy of the instructions is stored.

In examples, computing host 120, using the processing resource, executes an operating system and/or applications that may read data from and/or write data to memory 106. Computing host 120 may transmit a request to read data from and/or write data to memory 106 to the storage controller 100 across interface 102. Memory 106 may comprise any suitable memory or storage device, such as random access memory (RAM), read-only memory (ROM), electrically-erasable programmable read-only memory (EP-PROM), a storage drive, a solid state disk, a flash memory, and any other suitable type of volatile and/or non-volatile memory. In examples, storage controller 100 and memory 106 may be physically contained within the same enclosure to constitute a "disk drive" or other similar device.

Interface 102 may be any suitable interface, port, fabric, or connection for communicatively connecting/coupling computing host 102 to the storage controller. For example, interface 102 may comprise a peripheral component interconnect express (PCIe) interface, a serial ATA interface, a small computer system interface (SCSI), and a serial attached SCSI (SAS) interface. In various aspects of the present disclosure, multiple interfaces may be implemented, such as illustrated in FIG. 2. In examples having multiple interfaces, the interfaces may be of the same type or may be of different types.

Storage controller 100 facilitates data transfers between the computing host 120 and memory 106. For example, when computing host 120 writes data to and/or reads data from memory 106, storage controller 100 facilitates the data write and/or data read. As illustrated in the example of FIG. 1, the storage controller 100 comprises a front end processing unit 142, a data transfer arbiter 110, and a data transfer limiter 112. The front end processing unit 142 receives read and/or write requests operating in a control plane, and the data transfer arbiter 110 transfers the data across interface 102 between the computing host 120 and storage controller 100 in a data plane. The control plane and data plane are illustrated in FIG. 2 as control plane 240 and data plane 230.

Data transfer arbiter 110 arbitrates write and read access across interface 102 to memory 106. In particular, the data transfer arbiter 110 controls direct memory access (DMA) transfers in such a way so as to limit write and read average bandwidths to a predetermined value. In examples, the transfer rate within an input/output (IO) operation (e.g., read or write transactions) remains at the peak data transfer rate of the underlying link speed.

In examples, the write DMA and read DMA arrows of FIG. 1 represent transferring data from internal buffers (not illustrated) of the storage controller 100. For example, the storage controller 100 may comprise a DMA module (not illustrated) to facilitate the read DMA and write DMA.

Data transfer limiter 112 tracks an amount of data credits used by a data transfer across the interface and an amount of accrued data credits available to the interface. For example, data transfer limiter 112 monitors the bandwidth use and controls the transfers so as to direct the average transfer rate to the predetermined value. Data transfer limiter 112 eliminates the need for firmware to architect bandwidth pacing, in examples.

As illustrated in FIG. 1, a data read and/or data write request is received by the front end processing unit 142 via the interface 102 of computing host 120. The data transfer limiter 112 tracks the amount of data credits used by a data transfer request across the interface and also tracks an amount of accrued data credits available to the interface, which may accrue over time. The amount of accrued data credits reduces the amount of data credits used by the data transfer. Data transfer arbiter 110 selectively enables the data transfer request to/from memory 106 as a direct memory access (DMA) request when the amount of data credits used by the data transfer does not exceed a threshold. The data is then passed back to computing host 120 via interface 102. However, if the amount of data credits used by the data transfer exceeds the threshold, data transfer arbiter 110 selectively disables the data transfer request to/from memory. The data transfer may be disabled or halted until sufficient accrued data credits accrue to enable data transfer to resume.

In examples, the data transfer arbiter 110 and the data transfer limiter 112 are implemented circuits and/or hardware modules such as special-purpose hardware (e.g., application specific hardware, application specific integrated circuits (ASICs), as embedded controllers, hardwired circuitry, etc.), or as some combination or combinations of these. Additionally functionality of data transfer arbiter 110 and data transfer limiter 112 is described below.

FIG. 2 illustrates a block diagram of a storage controller 200 for selective enablement of data transfer using accrued data credits according to aspects of the present disclosure. Similarly to the example of FIG. 1, storage controller 200 arbitrates data transfer between a computing system such as computing host 120 of FIG. 1 and a storage device such as memory 106 of FIG. 1 across an interface such as interface 102 of computing host 120 of FIG. 1. The data arbitration prolongs the life of the storage device. Unlike the example of FIG. 1, the example of FIG. 2 utilizes separate data transfer arbiters and data transfer limiters for read and write operations. In examples, a write command may be larger than a read command; thus it may be desirable to limit write and read commands separately.

Write data transfer limiters 214a and 214b implement a rate limiting technique for write data transactions. In examples, write data transfer limiters 214a and 214b implement a leaky bucket technique to monitor and control write rates. The rate limiting technique tracks a number of credits used by a data transfer of an interface 202a, interface 202b, etc., and a number of credits earned by that interface over time. The following represents one example of pseudo code for implementing such a rate limiting technique.

```
At Power ON
{
  BKT = 0;
}
For every time tick (SF 1 us) /* Update the earned credits; set scaling factor to 1 microsecond */
{
  If (data transfer event) {
    If ((BKT + CU) > CPU))
      BKT = BKT + CU – CPU;
    Else
      BKT = 0;
  }
  Else {
    If (BKT > CPU)
      BKT = BKT – CPU;
    Else
      BKT = 0;
  }
}
For every data transfer event /* Update the used credits */
{
  If (time tick) {
    If ((BKT + CU) > CPU))
      BKT = BKT + CU – CPU;
    Else
      BKT = 0;
  }
  Else {
    BKT = BKT + CU;
  }
}
Always
{
  If (BKT >= TH_HIGH)
    data_transfer_allowed = 0; /* Halt the data transfers when at or above high threshold */
```

-continued

```
  Else if (BKT <= TH_LOW)
    data_transfer_allowed = 1; /* Resume data transfers when at or below low threshold */
  Else
    data_transfer_allowed = data_transfer_allowed; /* Maintain last state */
}
```

The credit bucket (BKT) represents a variable for tracking credits used and credits earned by an interface. When a data transfer occurs, the amount of data transferred in units of bytes is added to the credit bucket. For each time cycle (e.g., every microsecond, every 10 microseconds, etc.), a credits per update amount of credits are earned and used to reduce the used credits from the credit bucket. A threshold may be set to prevent the credit bucket from overflowing its maximum depth (i.e., the maximum amount of data the credit bucket can support).

The credits per update (CPU) is a computed parameter that is programmed for each data transfer limiter. It is derived from a committed rate, which indicates the average rate that the rate limiting technique would achieve (e.g., 400 MB/s committed rate for a x2 Gen3 PCIe interface). Expressed differently, the committed rate may represent IO processes per second (e.g., 100,000 IO processes per second of 4K size). The credits per update indicates the committed rate being supported. For example, for a desired committed rate, the credits per update is computed as credits per update=committed rate×$10^{-6}$. In examples, for every 1 micro second time tick, the credits per update amount of credits are released for that interface. The credits released can be used to compensate for any credits borrowed and used earlier for data transfers by that interface in certain aspects of the present disclosure. If there are no deficit credits, released credits may be lost.

In examples, to minimize inaccuracies introduced by small credits per update values corresponding to low bandwidth rates, a scaling factor (SF) can be applied. For example, instead of using credits per update every update time cycle, the credits per update can be used every scaling factor time cycle. In such an example, the programmed credits per update value would be multiplied by the scaling factor (e.g., the credits per update equation becomes credits per update=committed rate×$10^{-6}$×scaling factor).

In examples, write data transfer limiter 214a and 214b and read data transfer limiter 212a and 212b settings can be derived to support a desired endurance level. Storage device endurance may be expresses as drive writes per day (DWPD) for a warranty period. For example, for consumer products (laptop, desktop, external storage device, etc.), typical endurance may be 0.3 DWPD for a 3 year warranty period. To calculate the write data transfer limiter 214a and 214b and read data transfer limiter 212a and 212b settings (e.g., committed rate (CR)) in the consumer product implementation, the following calculation may be implemented for a 500 GB capacity drive and a desired DWPD of 0.3:

$$CR=\text{Write Bandwidth}=(DWPD\times\text{drive capacity in GB})/(\text{Number of seconds in a day}) \text{ GBps}$$

$$CR=(0.3\times500)/(24\times60\times60)=CR=1.74 \text{ MBps}$$

$$CPU=CR\times10^{-6}\times SF=1.74\times10^{6}\times10^{-6}\times10=17.4 \text{ with a scaling factor (SF) of 10}$$

In another example, such as enterprise applications for logging, caching, and application acceleration, the desired endurance may be 30 DWPD for a 5 year warranty period. To calculate the write data transfer limiter 214a and 214b and read data transfer limiter 212a and 212b settings (e.g., committed rate (CR)) in the enterprise product implementation, the following calculation may be implemented for a 16 TB capacity drive and a desired DWPD of 30:

CR=Write Bandwidth=(DWPD×drive capacity in GB)/(Number of seconds in a day) GBps CR=(30×16000)/(24×60×60)=CR=5555 MBps $CPU=CR \times 10^{-6} \times SF=5555 \times 10^6 \times 10^{-6} \times 1=5555$ with a scaling factor (SF) of 1

The following table provides examples of the variables used in the pseudo code above:

| Variable | Size | Comments |
| --- | --- | --- |
| CPU | 16-bits | Credits Per Update, update frequency is 1 us. Allows CRs upto 64 GB/s. CPU = Commited Rate (CR) × $10^{-6}$ × SF |
| SF | 8-bits | Scaling Factor, every SF tick times, CPU credits are released. |
| TH_HIGH | 32-bits | Enables, for example, 4 GB of burst data size. Burst size in time units may depend on the peak rate (PR) supported |
| TH_LOW | 32-bits | Controls resumption of operation, and can be used for fine tuning. |
| BKT | 32-bits | Enables, for example, bursts of size up to 4 GB. |
| CU | 27-bits | Enables, for example, logical block (LB) size in an IOP to be up to 128 MB. |

In some implementations, during low power modes of operation, the credit bucket may not be updated, which may introduce some initial discrepancy in the transfer rate after wakeup. An interface (e.g., interface 202a) may be idle for an extended period of time before entering a low power mod, and then, once entered, it may spend an extended amount of time in an idle state. Consequently, the bucket may not be updated during low power modes of operation. In examples, the credit bucket may be accessible to the local processor (e.g., front end processing unit 242) so that, if desired, the processor can reset the credit bucket after exiting the low power modes.

Write data transfer arbiter 210a may be a round-robin arbiter serving write requests from interfaces 202a and 202b. If write data transfer limiter 214a or 214b allows write requests to proceed, a write DMA operation is granted to that respective interface (e.g., interface 202a for write data transfer limiter (interface A) 214a, interface 202b for write data transfer limiter (interface B) 214b). In examples, write data transfer arbiter 210a operates in a work-conserving fashion such that if a particular interface (e.g., interface 202a) does not have any write data transfer need or if the interface is being throttled at that particular point in time, a second interface (e.g., interface 202b) may be enabled to use the write DMA resources (e.g., front end write DMA 232 and buffer 234 of data plane 230), provided that the second interface has write data to transfer and is not being throttled.

Read data transfer limiters 212a and 212b may be substantially similar in structure and function as the write data transfer limiters 214a and 214b. In some examples, a write data transfer limiter can be used for read bandwidth throttling and vice versa.

Read data transfer arbiter 210b may be a round-robin arbiter serving read request from interface 202a and 202b. A read request from an interface is qualified with the read data transfer limiter of that interface (e.g., interface 202a is qualified with read data transfer limiter (interface A) 212a, interface 202b is qualified with the read data transfer limiter (interface B) 212b). If the read data transfer limiter enables a read request to be processed, a read DMA operation is granted to that respective interface (e.g., interface 202a for read data transfer limiter (interface A) 212a, interface 202b is for read data transfer limiter (interface B) 212b). Read data transfer arbiter 210b operates in a work-conserving fashion such that if a particular interface (e.g., interface 202a) does not have any read data transfer need or if the interface is being throttled at that particular point in time, a second interface (e.g., interface 202b) may be enabled to use the read DMA resources (e.g., front end read DMA 236 and buffer 234 of data plane 230), provided that the second interface has read data to transfer and is not being throttled.

In examples, storage controller 200 further comprises a control line status register (CSR) 218 which implements control and status registers that may be used by write data transfer arbiter 210a and read data transfer arbiter 210b. Storage controller 200 may further comprise time source 216. In such an example, the amount of accrued data credits available to the interface increases over time, such as with each time cycle (e.g., every micro second, every 10 micro seconds, etc.).

In examples, storage controller 200 is communicatively connected to a memory (e.g., memory 106 of FIG. 1) via memory interface 204. Memory interface 204 is responsible for facilitating data transfers to and from the memory. In examples, memory interface 204 is sectioned into data plane 230 and control plane 240. Data plane 230 facilitates the direct memory access (reads and writes) to and from the memory. For example, front end write DMA 232, along with front end buffer 234, facilitates DMA for write data transfers to the memory. Similarly, front end read DMA 236, along with front end buffer 234, facilitates DMA for read dada transfers from the memory.

In examples, the write data transfer arbiters 210a, the read data transfer arbiter 210b, the read data transfer limiters 212a and 212b, and the write data transfer limiter 214a and 214b are implemented circuits and/or hardware modules such as special-purpose hardware (e.g., application specific hardware, application specific integrated circuits (ASICs), as embedded controllers, hardwired circuitry, etc.), or as some combination or combinations of these.

FIG. 3 illustrates a computing system 320 comprising a computer-readable storage medium 322 storing instructions 324-328 to selectively enable data transfer using accrued data credits according to aspects of the present disclosure. Computer-readable storage medium 322 is non-transitory in the sense that it does not encompass a transitory signal but instead is made up of one or more memory components configured to store the instructions 324-328. Computer-readable storage medium 322 may be representative of a memory resource and may store machine executable instructions 324-328, which are executable on a computing system such as computing host 120 of FIG. 1 as well as the computing system 320 of FIG. 3 in conjunction with processing resource 321.

In the example shown in FIG. 3, the instructions 324-328 comprise data credit accruing instructions 324, data transferring instructions 326, and data transfer halting instructions 328. Instructions 324-328 of computer-readable storage medium 322 may be executable so as to perform the techniques described herein, including the functionality described regarding the method 400 of FIG. 4.

For example, data credit accruing instructions 324 may correspond to block 404 of FIG. 4. Data transferring instructions 326 may correspond to block 406 of FIG. 4. Finally, data transfer halting instructions 328 may correspond to block 408 of FIG. 4. The functionality of these instructions 324-328 is described below with reference to the functional blocks of FIG. 4 but should not be construed as so limiting. Although not illustrated, additional examples may comprise data transfer resuming instructions.

FIG. 4 illustrates a flow diagram of a method 400 to selectively enable data transfer using accrued data credits according to aspects of the present disclosure. The method 400 may be executed by a storage controller such as storage controller 100 of FIG. 1 and/or storage controller 200 of FIG. 2. In other examples, the method 400 may also be stored as instructions on a non-transitory computer-readable storage medium such as computer-readable storage medium 322 of FIG. 3 that, when executed by a processing resource (e.g., processing resource 321 of FIG. 3), cause the processing resource to perform the method 400.

At block 402, the method 400 begins and continues to block 404. At block 404, the method 400 comprises accruing data credits. For example, the method 400 comprises accruing data credits over time in a data credit repository. A timing device, such as a clock mechanism, oscillator, etc., may generate a periodic timing signal, which represents a timing cycle (e.g., every micro second, every ten micro seconds, etc.). A predetermined amount of data credits are accrued each timing cycle. The method 400 continues to block 406.

At block 406, the method 400 comprises transferring data. For example, the method 400 comprises transferring data across an interface between a computing host and a storage device. Transferring data may comprise reading data and/or writing data. The method 400 continues to block 408.

At block 408, the method 400 comprises halting the transferring when data credits used exceeds a credit threshold. For example, the method 400 comprises halting the transferring across the interface when an amount of data credits used by the transferring exceeds a first credit threshold. The amount of accrued data credits (accrued at block 404) reduces the amount of data credits used by the transferring. The first credit threshold represents the point at which data transfer is halted. The method 400 continues to block 410 and terminates.

Additional processes also may be included. For example, the method 400 may comprise resuming the transferring across the interface when the number of credits used by the transferring is below the first credit threshold. However, in other examples, the resuming may not occur until the number of credits used by the transferring is below a second credit threshold, which may be less than the first credit threshold (i.e., the first credit threshold is greater than the second credit threshold). For example, the two levels of thresholds provides hysteresis and enables the write data transfer limiter and/or the read data transport limiter to operate smoothly. The second credit threshold can be set to zero to turn on a halted data transfer, or the second credit threshold can be set to a relatively low value. A low value second credit threshold, instead of zero, can compensate for any inefficiency involved in resumption of data transfers.

It should be understood that the processes depicted in FIG. 4 represent illustrations, and that other processes may be added or existing processes may be removed, modified, or rearranged without departing from the scope and spirit of the present disclosure.

The logical operations, functions, or steps described herein as part of a method, process, or routine may be implemented (1) as a sequence of processor-implemented acts, software modules, or portions of code running on a controller or computing system and/or (2) as interconnected analog and/or digital circuits or components. The implementation is a matter of choice dependent on the performance and other aspects of the system. Alternate implementations are included in which operations, functions, or steps may not be included or executed at all and/or may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is intended to convey that certain embodiments include, while other embodiments do not include, certain features, elements and/or steps. Thus, such conditional language is not intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Variations and modifications may be made to the above-described embodiments without departing substantially from the spirit and principles of the present disclosure. Further, the scope of the present disclosure is intended to cover any and all suitable combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. An apparatus to arbitrate data transfer between a computing host and a storage device across an interface, the apparatus comprising:
   a read data transfer limiter configured to
      track an amount of used read data credits comprising read data credits used by a read data transfer across the interface, and
      track an amount of accrued read data credits available to the interface;
   a write data transfer limiter configured to
      track an amount of used write data credits comprising write data credits used by a write data transfer across the interface, and
      track an amount of accrued write data credits available to the interface;
   a read data transfer arbiter configured to selectively enable and selectively disable the read data transfer across the interface based on the amount of used read data credits tracked by the read data transfer limiter; and
   a write data transfer arbiter configured to selectively enable and selectively disable the write data transfer across the interface based on the amount of used write data credits tracked by the write data transfer limiter.

2. The apparatus of claim 1, further comprising:
   a time source, wherein the amount of accrued data credits available to the interface increases over time.

3. The apparatus of claim 1, further comprising:
   a control line status register (CSR) configured to implement control and status registers utilized by each data transfer arbiter.

4. The apparatus of claim 1, further comprising:
a front end direct memory access engine configured to manage data relating to at least one of the read data transfer and the write data transfer.

5. The apparatus of claim 1, further comprising:
a front end processing unit configured to process a command relating to at least one of the read data transfer and the write data transfer.

6. The apparatus of claim 1, wherein the interface supports one of a peripheral component interconnect express (PCIe) interface, a serial ATA interface, a small computer system interface (SCSI), and a serial attached SCSI (SAS) interface.

7. A system to arbitrate data transfer between a computing host and a storage device across an interface, the system comprising:
a memory to store data accessed by the computing host; and
a storage controller comprising
a read data transfer limiter configured to
track an amount of used read data credits comprising read data credits used by a read data transfer across the interface, and
track an amount of accrued read data credits available to the interface,
a write data transfer limiter configured to
track an amount of used write data credits comprising write data credits used by a write data transfer across the interface, and
track an amount of accrued write data credits available to the interface,
a read data transfer arbiter configured to selectively enable and selectively disable the read data transfer across the interface based on the amount of used read data credits tracked by the read data transfer limiter, and
a write data transfer arbiter configured to selectively enable and selectively disable the write data transfer across the interface based on the amount of used write data credits tracked by the write data transfer limiter.

8. The system of claim 7, wherein the read data transfer arbiter selectively enables the read data transfer across the interface when the amount of used read data credits does not exceed the amount of accrued read data credits.

9. The system of claim 7, wherein the read data transfer arbiter selectively disables the read data transfer until the amount of accrued read data credits reaches an accrued read data credit threshold.

10. The system of claim 7, wherein the write data transfer arbiter selectively enables the write data transfer across the interface when the amount of used write data credits does not exceed the amount of accrued write data credits.

11. The system of claim 7, wherein the write data transfer arbiter selectively disables the write data transfer until the amount of accrued write data credits reaches an accrued write data credit threshold.

12. A method to arbitrate data transfer between a computing host and a storage device across an interface, the method comprising the steps of:
tracking an amount of used read data credits comprising read data credits used by a read data transfer across the interface;
tracking an amount of accrued read data credits available to the interface;
tracking an amount of used write data credits comprising write data credits used by a write data transfer across the interface;
tracking an amount of accrued write data credits available to the interface;
selectively enabling and selectively disabling, by a read data transfer arbiter, the read data transfer across the interface based on the amount of used read data credits that have been tracked; and
selectively enabling and selectively disabling, by a write data transfer arbiter, the write data transfer across the interface based on the amount of used write data credits that have been tracked.

13. The method of claim 12, wherein the step of selectively enabling and selectively disabling, by a read data transfer arbiter, the read data transfer across the interface comprises the steps of:
storing a first read threshold, the first read threshold defined by a maximum amount of read data credits, expressed in units of bytes, that the interface can support;
storing a second read threshold, the second read threshold defined by a predetermined maximum amount of read data credits, expressed in units of bytes totaling less than the first read threshold, beyond which resumption of read data transfer across the interface is not permitted following a disabling of the read data transfer across the interface;
disabling the read data transfer across the interface when the amount of used read data credits exceeds the first read threshold; and
enabling resumption of read data transfer across the interface, following a disabling of the read data transfer across the interface, when the amount of used read data credits does not exceed the second read threshold, wherein the amount of accrued read data credits reduces an amount of read data credits used by the read data transfer.

14. The method of claim 12, wherein the step of selectively enabling and selectively disabling, by a write data transfer arbiter, the write data transfer across the interface comprises the steps of:
storing a first write threshold, the first write threshold defined by a maximum amount of write data credits, expressed in units of bytes, that the interface can support;
storing a second write threshold, the second write threshold defined by a predetermined maximum amount of write data credits, expressed in units of bytes totaling less than the first write threshold, beyond which resumption of write data transfer across the interface is not permitted following a disabling of the write data transfer across the interface;
disabling the write data transfer across the interface when the amount of used write data credits exceeds the first write threshold; and
enabling resumption of write data transfer across the interface, following a disabling of the write data transfer across the interface, when the amount of used write data credits does not exceed the second write threshold, wherein the amount of accrued write data credits reduces an amount of write data credits used by the write data transfer.

* * * * *